United States Patent [19]
Crabere et al.

[11] Patent Number: 5,499,784
[45] Date of Patent: Mar. 19, 1996

[54] FLIGHT REFUELLING SYSTEM

[75] Inventors: Henri Crabere, L'Union; Gilbert Mitonneau, Toulouse; Julien Maury, Balma, all of France

[73] Assignee: Aerospatiale Societe Nationale Industrielle, Paris Cedex 16, France

[21] Appl. No.: 241,018

[22] Filed: May 11, 1994

[30] Foreign Application Priority Data

May 12, 1993 [FR] France ................... 93 05718

[51] Int. Cl.[6] .................... G09G 05/00; B64D 37/00; B64D 37/14
[52] U.S. Cl. .................. 244/135 A; 244/135 R; 345/115
[58] Field of Search .......... 244/135 R, 135 A, 244/1 R; 340/945; 345/115, 118, 119

[56] References Cited

U.S. PATENT DOCUMENTS

| | | | |
|---|---|---|---|
| H297 | 7/1987 | Schultz | 244/135 A |
| 3,917,196 | 11/1975 | Pond et al. | 244/135 A |
| 4,025,193 | 5/1977 | Pond et al. | 244/175 |
| 4,158,885 | 6/1979 | Neuberger | 244/135 A |
| 4,160,534 | 7/1979 | White | 244/135 A |
| 4,247,843 | 1/1981 | Miller | 345/115 |
| 4,298,176 | 11/1981 | Kendall | 244/135 A |
| 4,398,685 | 8/1983 | Task et al. | 244/135 A |
| 5,036,315 | 7/1991 | Gurley | 345/119 |
| 5,157,451 | 10/1992 | Taboada et al. | 358/108 |
| 5,351,129 | 9/1994 | Lai | 345/115 |

FOREIGN PATENT DOCUMENTS

| | | |
|---|---|---|
| 2569652 | 7/1986 | France . |
| 2572706 | 9/1986 | France . |
| WO91/06471 | 5/1991 | WIPO . |
| WO93/07055 | 4/1993 | WIPO . |

Primary Examiner—William A. Cuchlinski, Jr.
Assistant Examiner—Virna Lissi Mojica
Attorney, Agent, or Firm—Michael N. Meller

[57] ABSTRACT

The invention relates to a system for the flight refueling of at least one first aircraft provided with an intermediate fuel intake means connected to at least one fuel tank, by a second aircraft equipped with an intermediate fuel supply means connected to at least one fuel supply tank and which can be connected to the intermediate fuel intake means so as to permit, with the aid of at least one fuel pump, the transfer of fuel contained in the tank(s) of the second aircraft to the tank(s) of the first aircraft. This system includes at least one camera positioned below the aircraft, at least one multimode display to display at least one image from a camera and symbology information such as fuel data information used during the refueling operation. The system further includes multifunction equipment incorporating a screen for monitoring the refueling operation and a control keyboard to control several operations, in a single work station within the second aircraft for checking the flight refueling of the first aircraft.

8 Claims, 6 Drawing Sheets

FLIGHT REFUELLING SYSTEM

TECHNICAL FIELD

The invention relates to a flight refuelling system. Such a system permits the transfer of fuel from the tanks of a refuelling aircraft to the tanks of a refuelled aircraft.

In order to carry out this operation three types of aircraft exist, namely the refuelling aircraft, the refuelled aircraft and the refuelling-refuelled aircraft.

PRIOR ART

The limited fuel carrying capacity of aircraft makes it necessary, in military use and for autonomy reasons linked with their missions, to refuel them in flight.

A refuelling aircraft performs its missions by day and night with the aid of devices which can be installed, separately or jointly, as a function of the needs of the user. In rising order of the fuel flow which can be delivered, said devices comprise:

refuelling pods generally positioned below the wing and permitting the unwinding of a hose provided with a basket member and the refuelling of aircraft equipped with a probe;

winch beneath the fuselage, like the preceding device permitting the unwinding of a hose equipped with a basket member;

telescopic tube beneath the fuselage and controllable in azimuth, elevation and distance, so as to permit the refuelling of aircraft equipped with a receptacle.

Moreover, the installation of a probe or a receptacle at the front of the refuelling aircraft also gives the possibility of refuelling it.

These devices are connected to the aircraft fuel tanks and often to supplementary tanks installed in its fuselage. The use of such devices makes it necessary to make available to an operator supplementary means for:

monitoring: the refuelled aircraft, the satisfactory operation of the aforementioned devices and in general terms the fuel (flow to the refuelled aircraft, remaining fuel, etc.);

controls: unwinding and winding up of the pod hoses, starting up of fuel pumps, etc.;

controlling: the telescopic tube.

Such devices are more particularly described in Flight International pp. 929 to 940 of 10.4.1982.

A survey of the different methods used in these devices is given hereinafter for different aircraft types. These configurations were chosen for describing all the aforementioned devices, but can differ on the same aircraft type or on a type which is not mentioned. For example, certain Boeing 707's are equipped with two Transall-type pods and have a winch in the landing gear reception area and a probe on the aircraft nose.

A British Aerospace VC10 aircraft can have two underslung pods, a winch beneath the fuselage and a probe. This aircraft has wing fuel tanks and supplementary tanks in the fuselage. Its working station is in the cockpit (extension of the mechanic's station of the non-refuelling VC10). The operator checking means are on two panels and among other instruments.

In a Boeing KC135 aircraft a telescopic tube beneath the fuselage is associated with a working station. The operator lying flat on his stomach looks through a fuselage opening provided with a window. The tube can be engaged beneath the fuselage in the non-refuelling phase. A handle makes it possible to control this tube manually by a mechanical connection using mobile hydraulic control surfaces. Various circular dials make it possible to monitor the operation (azimuth indicator, etc.).

A Douglas KC10 aircraft has a winch beneath the fuselage, a telescopic tube and a working station to the rear of the fuselage. The tube is manually controlled by electric control means.

In a Boeing 707-IAI-type aircraft, the installation of the telescopic tube developed by the Israel Aircraft Industry is associated with the putting into place of three cameras, two beneath the fuselage to give vision of the receptacle of the refuelled aircraft in relief and one below the tube in order to obtain better accuracy in the final control phase (docking of the end of the telescopic tube and the receptacle); a working station equipped with two cathode screens, each connected to one of the two cameras installed beneath the fuselage and associated with a combining means which superimposes the two images by polarizing them in two perpendicular directions. By means of special goggles, the operator sees with each of his eyes the image given by the camera located on the same side, so that he has a three-dimensional vision of the outside world and in particular the refuelled aircraft. The control of the tube is similar to that of the Boeing KC135.

In general terms, there are two possible constructions for fuel transfer between the refuelling aircraft and the refuelled aircraft:

either the intermediate fuel intake means is a probe installed at the front of the first aircraft and the intermediate fuel supply means is a refuelling pod installed below the wing or a winch installed beneath the fuselage of the second aircraft;

or the intermediate fuel intake means is a receptacle located on the upper portion of the first aircraft and the intermediate fuel supply means is a telescopic tube positioned below the fuselage of the second aircraft and in this case a camera is advantageously located on the telescopic tube.

The main disadvantages of these known constructions relate to the human-machine interface in the refuelling aircraft for the operator controlling the refuelling operation.

As a function of the device, said interface is located in the cockpit or in the fuselage, so that there are two possible working stations.

When the location is at the rear, the operator and the refuelling aircraft flight crew can only communicate by intercom, which is not favourable to good team work.

In the case of the VC10 the location is at the front, but the human-machine interface overlaps with the checking means of other systems.

In the case where the operator is at the rear, he only has a limited number of informations, mainly those associated with the control of the telescopic tube or the unwinding of the winch, e.g. having only few informations concerning the fuel.

In connection with the mission, only the IAI solution permits the recording and reading of the stored refuelling phases by means of cameras in the way in which they were seen by the operator.

ADVANTAGES OF THE INVENTION

The system according to the invention offers the following advantages:

it is independent of the aircraft type and evolutive;

a single working station, e.g. in the cockpit area, is required, so that the operator and crew are then in visual contact;

the checking means are located in front of the operator and the operations can be organized by phase and subphase (e.g. the tube control subphase is not presented, monitored and controlled except before telescopic tube-receptacle contact);

supplementary informations can be made available to the operator to enable him to better follow the refuelling operation. He can e.g. have a complete display of the fuel system of any aircraft, messages indicating the procedure to be followed or informing him of a breakdown in another aircraft system such as the hydraulic system, so that the fuel pumps can be turned;

outside the refuelling phase, the system makes it possible to give the operator an e.g. navigator function, so as to complete the activities of the flight crew;

the overall system makes it possible to carry out automatic tests and contribute to maintenance;

the system according to the invention favours a greater automation of the flight refuelling operation, e.g. for the control of the telescopic tube, so that the operator's workload can be reduced.

DESCRIPTION OF THE INVENTION

The invention relates to a system for the flight refuelling of at least one first aircraft, equipped with an intermediate fuel intake means connected to at least one tank, by a second aircraft, equipped with an intermediate fuel supply means connected to at least one tank and which can be connected to the intermediate intake means so as to permit, with the aid of at least one fuel pump, the transfer of the fuel contained in the tank or tanks of the second aircraft to the tank or tanks of the first aircraft, characterized in that it comprises at least one camera positioned below the fuselage of the second aircraft, at least one multimode display making it possible to display at the same time at least one image from a camera and/or at least one symbology, which is a diagrammatic representation of the operation of certain devices of the second aircraft used during the refuelling operation, at least one multifunction equipment incorporating a screen and a keyboard making it possible to perform several operations, so as to render possible the installation in a single working station, within the second aircraft, of all the instruments necessary for the operator to check the flight refuelling of the first aircraft.

For each multimode screen, the symbology can be associated with the fuel of the second aircraft supplicable to the first aircraft, with the control of the telescopic tube or the basket member equipped with mobile surfaces in manual or automatic mode or the navigation or other functions.

Advantageously each multifunction equipment gives access to successive menus.

Advantageously the architecture of the working station is duplicated so as to enable the operator to prepare the following sequence or satisfactorily perform his mission in the case of a failure of one of the equipments of the second aircraft.

Advantageously a loader (magnetic or optical reader) permits the updating of the navigation data contained in the bulk memory of the multifunction equipment or introduce with respect to the processing of the informations specificities of the refuelling or refuelled aircraft.

Thus, the invention is a modular flight refuelling system architecture concept. The system according to the invention permits the adaptation to different refuelling procedures: pod, winch, telescopic tube, probe and receptacle. It is evolutive and supplementary functions can be added. It is also independent of the aircraft type.

Such a system also gives the operator the possibilities:

of carrying out tasks linked with the refuelling with a better ergonomy, whilst maintaining the necessary redundancies for the success of the mission;

carrying out these tasks at the same work location (e.g. working station in the cockpit area);

assisting the control crew outside the refuelling phase (the working station remaining usable for actions other than refuelling).

DETAILED DESCRIPTION OF EMBODIMENTS

Figure 1:
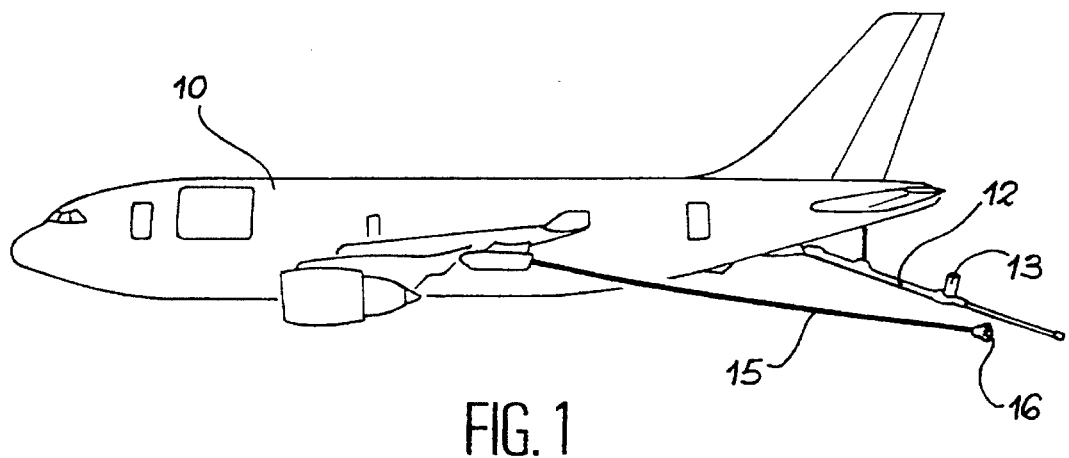
FIGS. 1 and 2 illustrate the flight refuelling operation of one or more aircraft.
Figure 2:
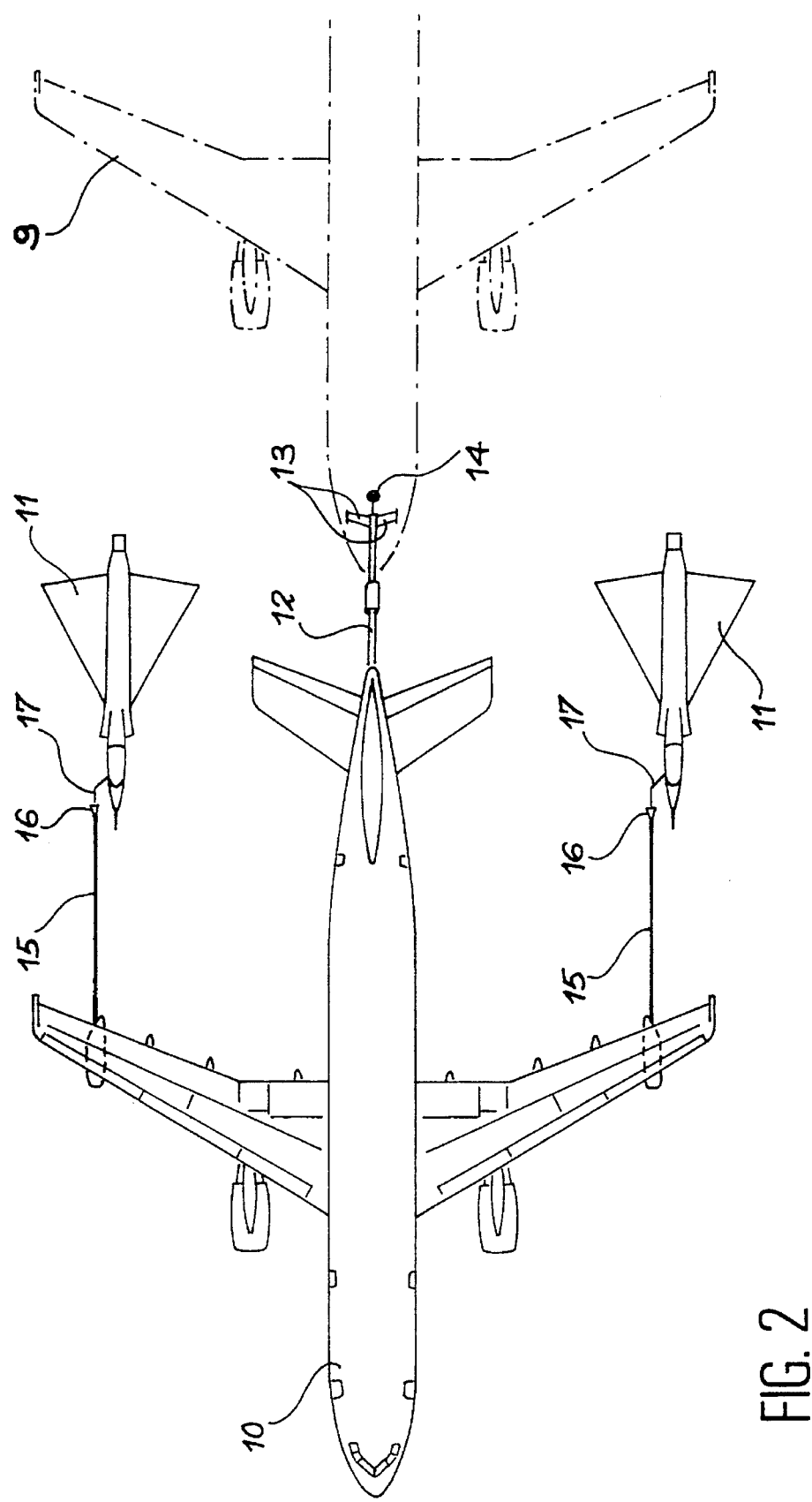

The flight refuelling procedure, as illustrated in FIGS. 1 and 2, is almost as old as military aircraft themselves. The means used have advanced in proportion to general technological advances. The present invention must be looked upon as the final improvement stage provided by military aeronautics.

It involves an original flight refuelling system architecture making use of the latest technical innovations. It enables an operator, installed under good conditions in a working station, e.g. located in the cockpit of the refuelling aircraft 10, to ensure all the operations associated with refuelling. The refuelling aircraft 10 is able to refuel three combat aircraft 11 simultaneously or, as shown in dotted line form in FIG. 2, a refuelling-refuelled aircraft 9, which gives an idea of the workload of the operator responsible for this operation. All the parties involved consider this operation to be difficult and even testing for the pilots of refuelled aircraft.

At present there are two main procedures for the actual transfer of fuel from the refuelling aircraft 10 to the refuelled aircraft 11 or 9.

In the first procedure, the refuelling aircraft 10 is provided with a boom 12, which is a telescopic, rigid tubular mechanism carrying mobile surfaces 13 permitting the "control" thereof. In its upper, front part the refuelled aircraft 9 then has a receptacle 14 which can be likened to a funnel and into which can be fitted the telescopic tube of said mechanism 12 integral with the refuelling aircraft.

In the second procedure, the refuelling aircraft, with the aid of a pod or winch, unwinds and allows to trail behind a flexible tube 15 at the end 16 (provided with a basket member) of which is connected the refuelled aircraft, which then carries for this purpose a refuelling "probe" 17 located at the front of the aircraft. This probe can also be associated with a telescopic tube. However, in the latter case the tube is provided with an adaptor, so as to permit the fixing thereto of a basket member, depending on the fuel flow rate.

The system according to the invention enables the two procedures to cohabit on the same refuelling aircraft.

In addition, the interconnection of the flight refuelling system and aircraft systems enables the operator responsible for the refuelling to participate in the crew activities outside the period of said refuelling operations.

Although not referred to up to now, the architecture proposed incorporates digital computers interconnected with one another and also connected to other aircraft computers.

FIG. 2 illustrates the possibility of the flight refuelling of aircraft 11,9 by the same refuelling aircraft 10. The refuelling aircraft 10 e.g. comprises a flexible tube 15 at the end of each wing and a telescopic tube 12 beneath the fuselage.

The system according to the invention has at least one camera positioned below the aircraft fuselage. For example, it is envisaged to install on a refuelling aircraft 10 of the Airbus A310-300 or A300-600 type four cameras, three at the landing gear in order to cover the rear area of the aircraft and one (or two for technical and redundancy reasons) beneath the telescopic tube so as to display the relative positions of the end of the telescopic tube and the receptacle of the refuelling aircraft.

The system according to the invention uses at least one multimode display, as well as at least one multifunction equipment located in a working station available to the operator responsible for the checking and control of the flight refuelling.

Figure 3:
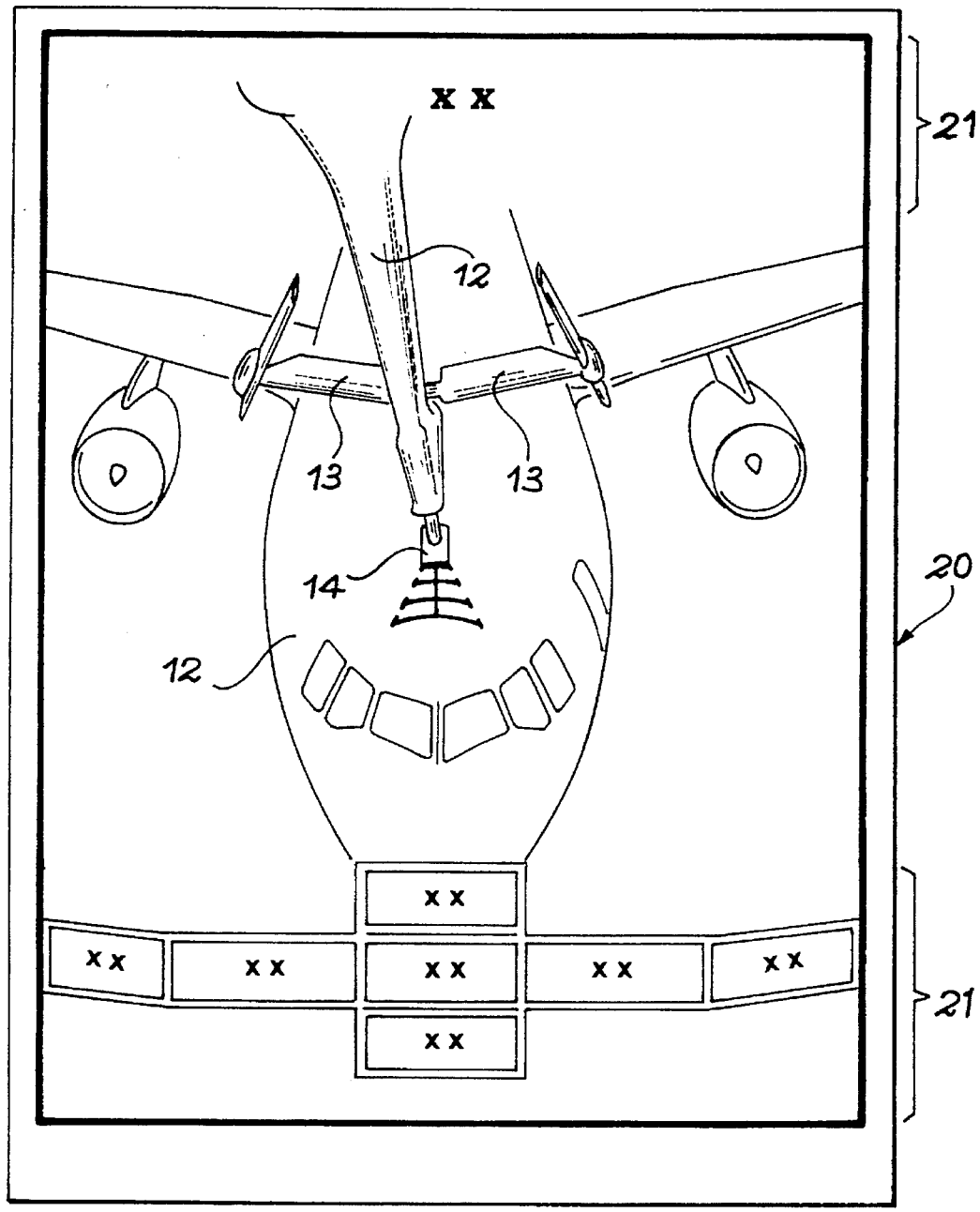

FIG. 3 shows a multimode display 20 able to display on the same screen an image from a camera and/or a symbology. In the example of FIG. 3, the image of the refuelled aircraft 9 by a telescopic tube-type device 12 is associated with fuel data 21. The different indications XX represent the available fuel quantities either in total or for each of the tanks shown diagrammatically at the bottom of the screen. Two other symbology examples are given in FIGS. 4 and 5. The image supplied by a camera connected to said screen can be superimposed on said symbologies.

Figure 4:
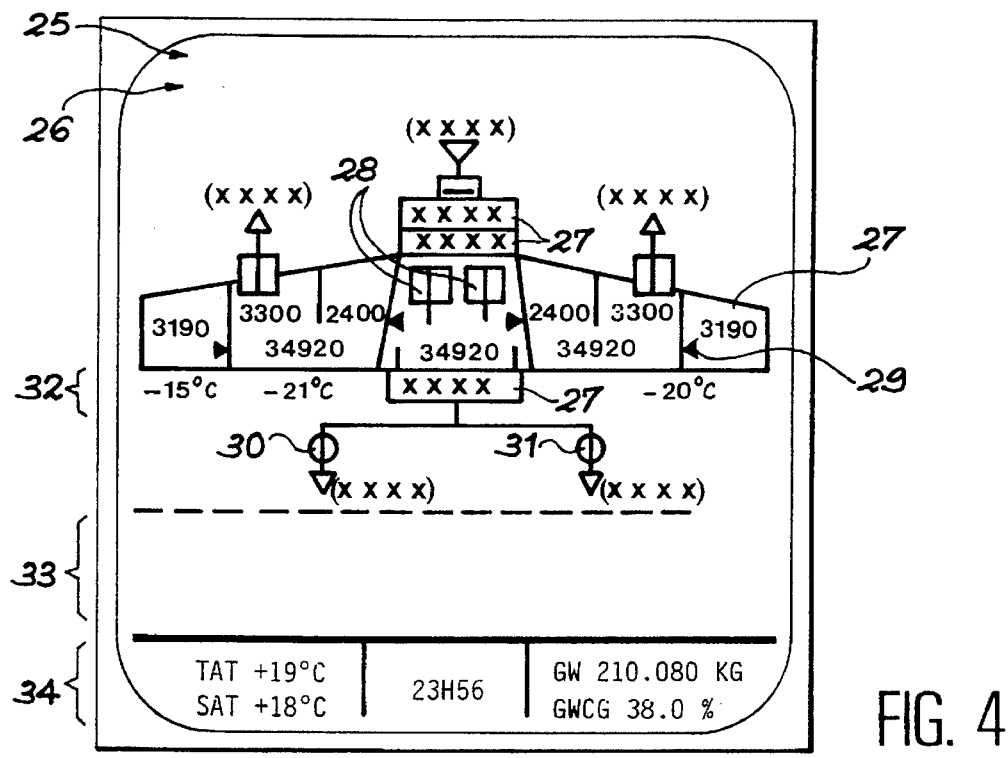

The first example shown in FIG. 4 illustrates the symbology associated with the fuel of the aircraft, i.e.:
the total fuel 25,
the available fuel for refuelling 26,
the location, on a diagrammatic representation of the aircraft, of the fuel quantities 27 remaining in the tanks,
the satisfactory operation of the fuel pumps 28,
the fuel transfer directions 29,
the fuel flows to aircraft refuelled by pods, the winch 30 or the telescopic tube 31 of the refuelling aircraft,
the fuel flows to the refuelling aircraft by the probe or receptacle,
the fuel temperatures 32,
the message lines 33 (indicating failures, corrective actions to be carried out, remaining operational capacities),
information on the flight 34 (total temperature, static temperature, time, aircraft weight, centre of gravity position).

In FIG. 4, the letters XX represent the fuel quantities (or flow rates when placed in brackets). This image is evolutive and a function of the device or devices installed on the aircraft.

Figure 5:
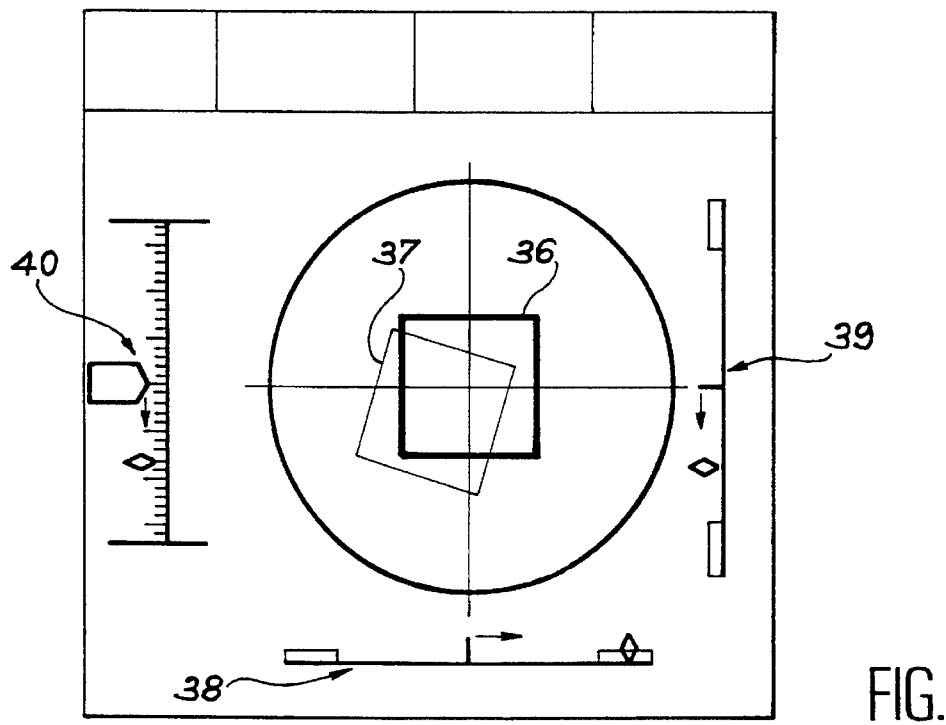

The second example shown in FIG. 5 illustrates an image associated with the control of the telescopic tube, i.e. relative position of the tube 36 and receptacle 37, azimuth 38, elevation 39 and tube-receptacle distance information 40, tendencies with respect to the control objectives, control state information and messages. The symbols in the drawing have the following meaning:
◊ objective to be reached,
→ tendency of the control,
☐ limitation ranges.

This principle can be applied to a device of the winch type, if the latter is equipped with mobile surfaces located on the basket member.

Figure 6:
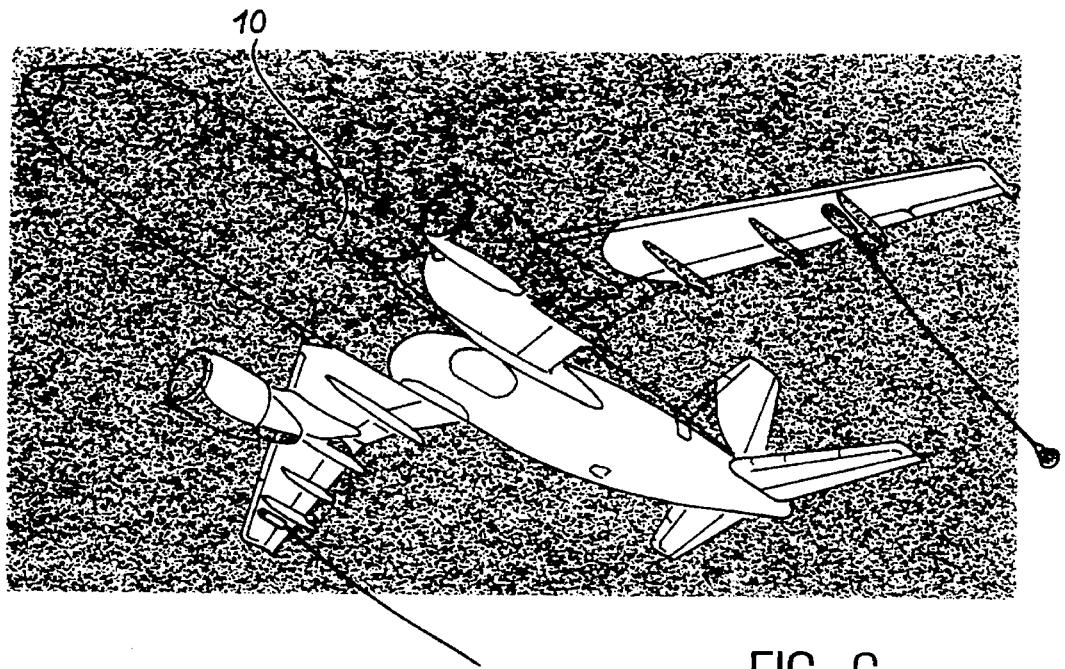
Figure 7:
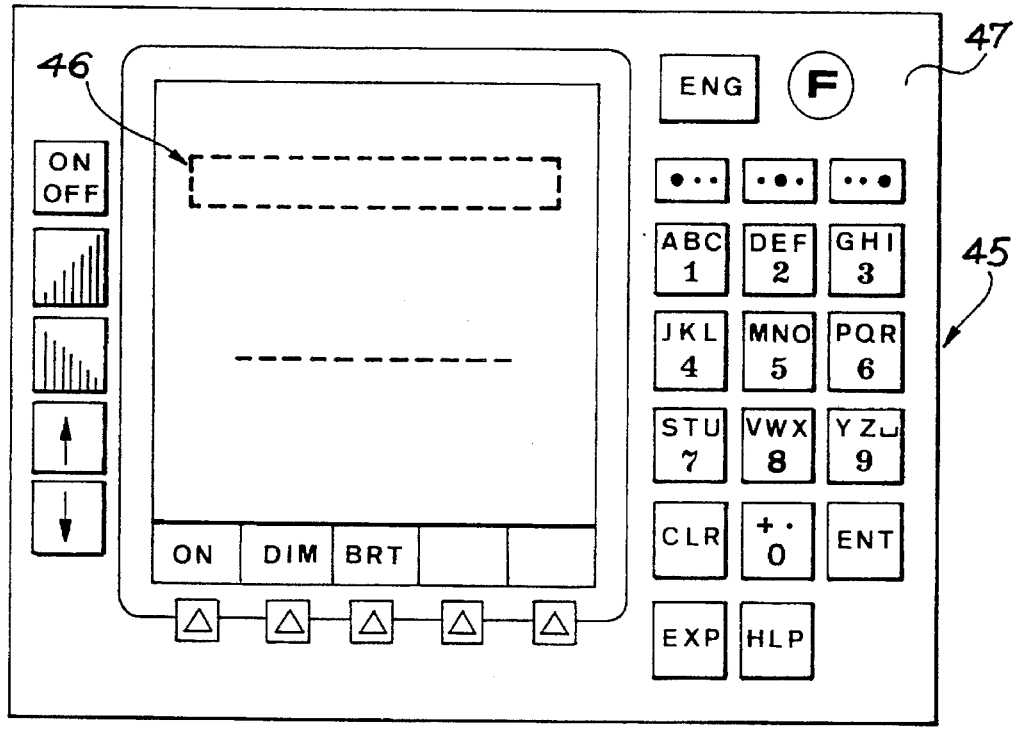

FIG. 7 shows a second equipment of the system according to the invention in the form of a multifunction equipment 45 having a screen 46 and a control keyboard 47. For example, FIG. 6 show a possible illumination at night of the refuelling aircraft 10. FIG. 7 then indicates on the multifunction display, a possibility of operating the corresponding lamps either one by one, or simultaneously.

When a task is performed, by means of a menu the operator can then perform another operation. For a refuelling operation the following phases then exist: stored tube, tube control (rough approach, manipulation, docking), refuelling, tube returned to the storage position.

By means of the examples described hereinbefore and the supplementary means to be installed in the aircraft as compared with the previously mentioned prior art devices, it can be seen that the association of multifunction and multimode display equipments makes it possible to only supply the operator with information useful for a given phase or subphase and to ensure tasks:
of the monitoring type for the multimode display mainly of the refuelled aircraft (camera image), the fuel system (symbology) of the refuelling aircraft, etc.
of the control type by the multifunction equipment, i.e. winding up or unwinding of the nacelle hose;
the telescopic tube control.

The tasks of a monitoring type are also supplemented by messages supplied on the screens.

Figure 8:
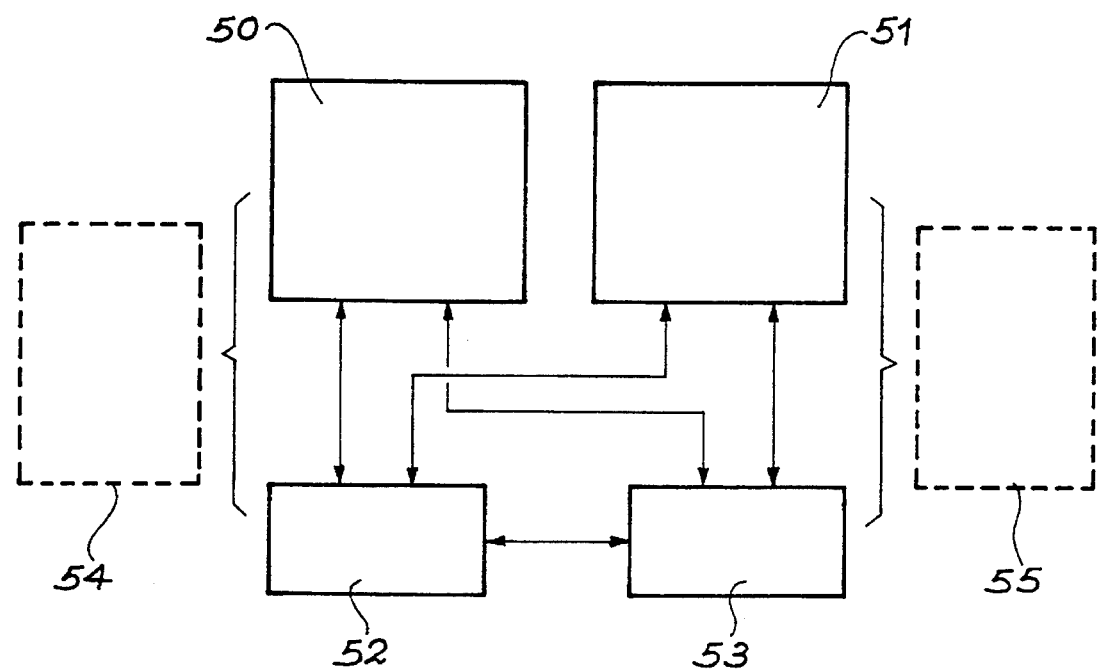

In the system according to the invention the aforementioned means are duplicated so as to enable the operator to prepare the following sequence or perform his mission in the case of a failure of one of the preceding equipments, so that the duplicated architecture of FIG. 8 is chosen. The possibility of adding e.g. in the development phase a third multimode display does not interfere with the above principles. This architecture, based on two multimode displays 50,51 and two multifunction equipments 52,53 permits:
the interface with all the intakes 54 linked with the previously described devices and aircraft systems:

refuelling pods, refuelling winch, telescopic tube, probe or receptacle, aircraft systems linked with the fuel, hydraulics (fuel pump supply), electric power generations, etc.

a loader (magnetic or optical reader) making it possible to update the navigation data contained in the bulk memory of the multifunction equipment or introduce with respect to the processing of informations specificities of the refuelling or refuelled aircraft, miscellaneous: cameras, control handle, etc.;

the processing of informations (multifunction equipments 52,53):

shaping the inputs-outputs, display of menus of the controls, activation of the latter and state report, preparation of camera images and symbology of the fuel system, producing control laws and control symbology laws of the telescopic tube in automatic or manual mode, navigation calculations and preparation of the navigation symbology, issuing of messages relative to the use of the multifunction equipment, general architecture testing for maintenance reasons,
miscellaneous;

display (multimode 50,51):
  of the image supplied by the corresponding camera,
  of the fuel system,
  of the probe control,
  of the navigation,
  of messages relating to:
    normal operations: list of actions to be performed without malfuntion (checklist),
    operations in the case of breakdowns: list of actions to be performed in the presence of malfunctions, loss of operational capacity in the case of a breakdown;

the interface with all the outputs 55 connected to the previously described devices:
  pods,
  winch,
  telescopic tube,
  miscellaneous: information returned to flight crew.

Such an architecture also gives the possibility:
of developing, e.g. improving each of the above points,
taking account of others,
deciding during the development phase the equipment which is to carry out the processing.

The associated computers and the corresponding processing operations can be integrated into multifunction equipment blocks 52,53, display 50,51 or external means (not shown in FIG. 8 in this case).

Figure 10:
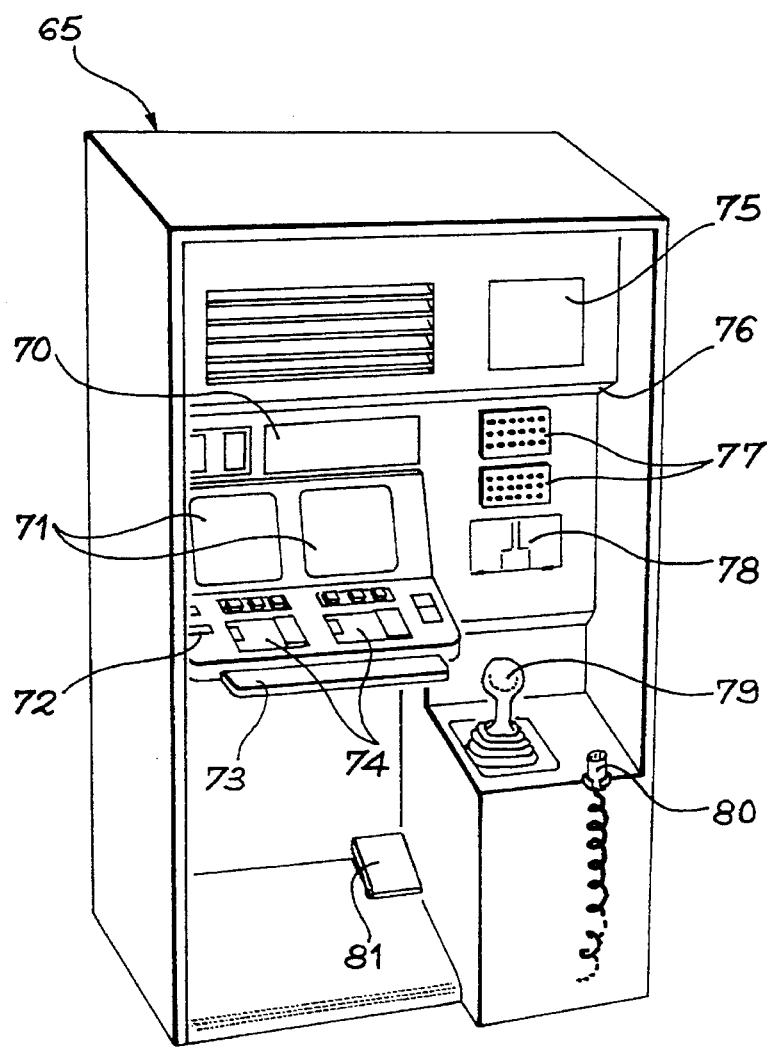
FIGS. 3 to 10 illustrate different characteristics of the system according to the invention.
Figure 9:
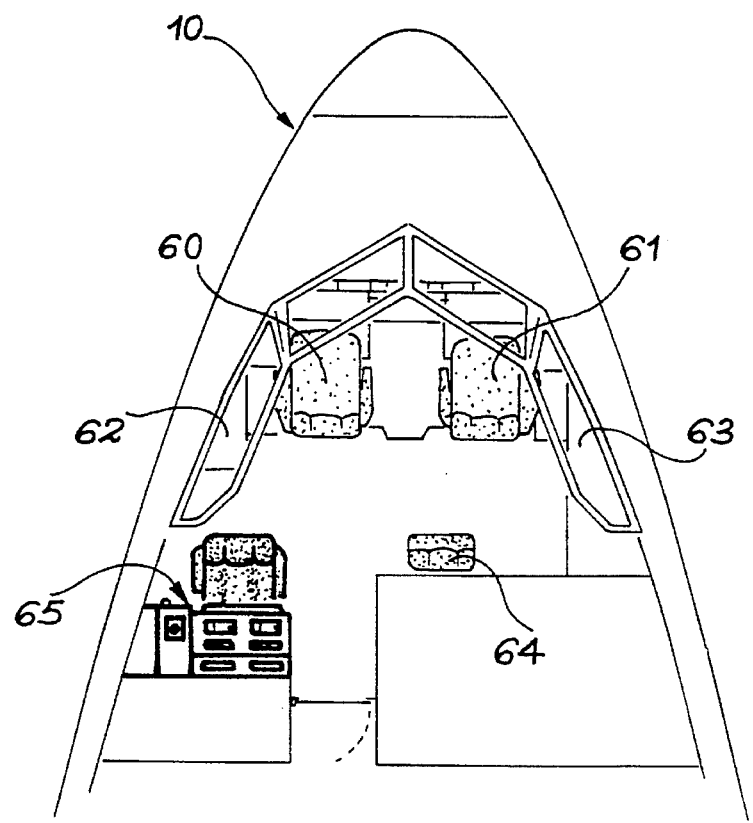

In order to further specify the integration of the system according to the invention into a refuelling aircraft, FIGS. 9 and 10 use in exemplified manner Airbus A310-300 or A300-600-type aircraft with a possible location of the working station in the cockpit and the installation associated with the equipment in question including supplementary equipment which, although not part of the architecture in question, still constitutes a complement for rapid access and/or safety reasons (e.g. disconnection of the telescopic tube, cutting the nacelle hoses, etc.) or which are indispensable to the environment of the operator (e.g. oxygen in the case of depressurization, radio link with the flight crew, etc.).

In this example, FIG. 9 shows:
the pilot seat 60,
the copilot seat 61,
the right and left consoles 62,63,
the jump seat 64 of a third occupant (observer),
the working station 65.

FIG. 10 shows the working station 65 for the fuel operator and which inter alia incorporates:
multimode displays 71,
multifunction equipment 74,
control handle for the telescopic tube 79 or a basket member equipped with mobile surfaces,
the remote control of the telescopic tube 72,
the headset racks 75,
a microphone 80,
an intercom pedal 81,
the operator air conditioning 76,
an oxygen mask 78,
the circuit-breakers 77,
a folding work table 73.

Therefore the system according to the invention has the following characteristics:
it can be installed at a single location;
installed in the cockpit area, it permits a better coordination between the operator's actions and the flight crew;
it is modular and can easily evolve;
it is materially independent of the aircraft type;
it offers a space gain for the operator when carrying out his monitoring, control and checking operations;
it enables the operator to perform these tasks only taking account of the phases or subphases taking place;
it adds supplementary possibilities during refuelling so that the operator is better informed and more efficient;
it has a greater ergonomy by making the man-equipment relations as comfortable as possible mainly due to the message function and the making available only of useful information;
outside the refuelling phase, it permits the addition of supplementary functions;
it offers a maintenance aid;
it permits automation and therefore a reduction of the operator's workload.

We claim:

1. System for the flight refueling of at least one first aircraft, equipped with an intermediate fuel intake means connected to at least one fuel tank, by a second aircraft, equipped with an intermediate fuel supply means including refueling means connected to at least one fuel supply tank and connectable to the intermediate fuel intake means so as to permit, with the aid of at least one fuel pump, the transfer of the fuel contained in the supply tank(s) of the second aircraft to the fuel tank(s) of said first aircraft, at least one camera being located below the fuselage of the second aircraft, at least one means for providing symbology information comprising a diagrammatic representation of the relative position of said supply means and fuel intake means and/or fuel data information including the location of fuel quantities for the first aircraft, at least one multimode display being installed in a working station within the second aircraft for displaying an image from the camera and for displaying an image of said symbology information either simultaneously or sequentially and at least one multifunction equipment comprising a screen and means for monitoring on said screen the refueling operation by day or night from said working station and a control keyboard for controlling several operations including the operation of said telescopic tube as well as for providing an operator with refueling information to monitor and assist in the refueling procedure throughout the refueling phase from the working station.

2. System according to claim 1, wherein the working station is located in the cockpit area.

3. System according to claim 1, wherein the intermediate fuel intake means is a probe installed at the front of the first aircraft and the intermediate fuel supply means is a refuelling pod installed beneath the wing or a winch mounted beneath the fuselage of the second aircraft.

4. System according to claim 1, wherein the intermediate fuel intake means is a receptacle located on the front, upper part of the first aircraft and the intermediate fuel supply means is a telescopic tube located below the fuselage of the second aircraft.

5. System according to claim 4, wherein a camera is located on the telescopic tube.

6. System according to claim 1, wherein a symbology of each multimode screen is associated with navigational data.

7. System according to claim 1, wherein each multifunction equipment functions in the form of successive menu pages.

8. System according to claim 6, wherein said multifunction equipment further comprises a loader (magnetic or optical reader) for updating said navigation data.

* * * * *